Figure 1:
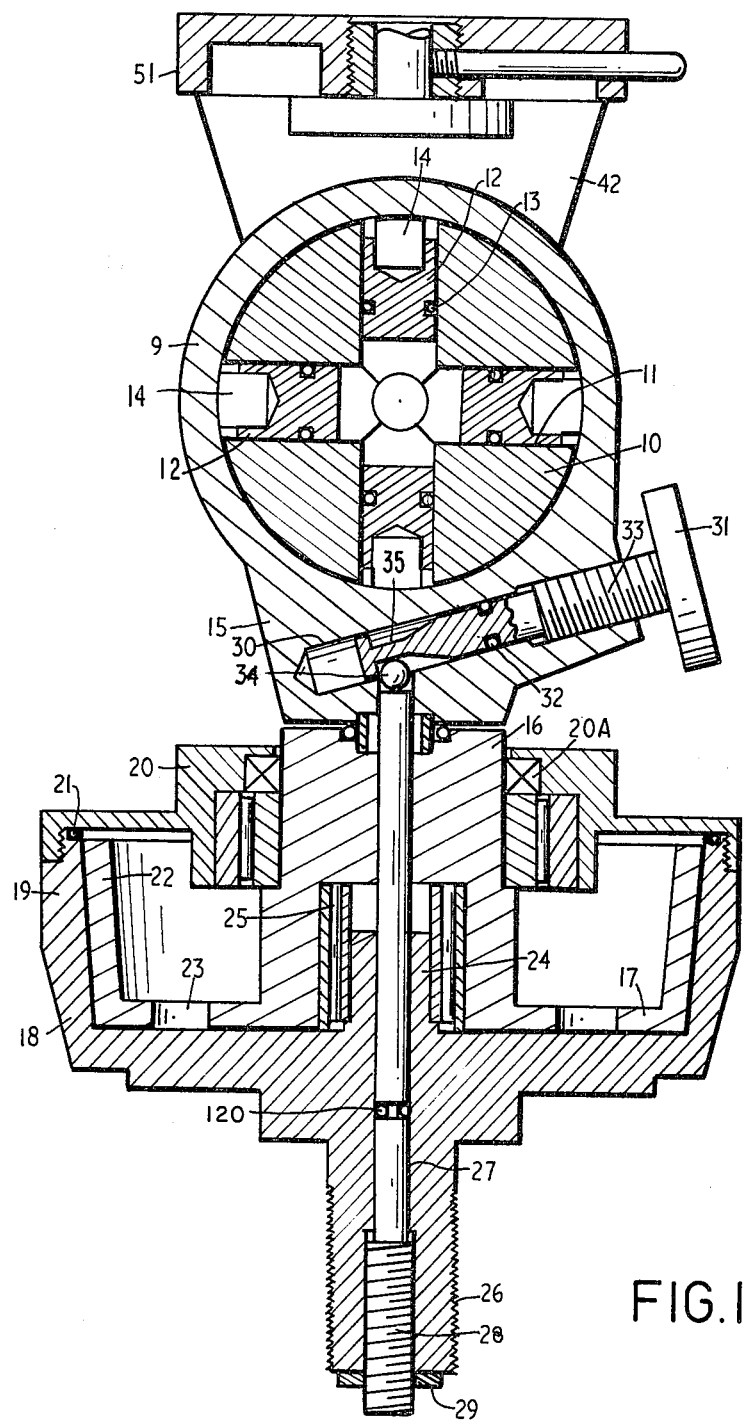

United States Patent [19]

Miller et al.

[11] 4,044,982
[45] Aug. 30, 1977

[54] SUPPORTS FOR CAMERAS

[75] Inventors: Jeanette Mary Miller; Robert Eric Miller, both of Rose Bay, Australia

[73] Assignees: Victoria Alice Miller; Timothy Robert Miller, both of Rose Bay, Australia; part interest to each

[21] Appl. No.: 407,687

[22] Filed: Oct. 18, 1973

[30] Foreign Application Priority Data

Oct. 25, 1972 Australia ................................ 967/72

[51] Int. Cl.² ............................................ F16M 11/12
[52] U.S. Cl. ................................................. 248/183
[58] Field of Search ............... 248/183, 184, 185, 186, 248/178

[56] References Cited

U.S. PATENT DOCUMENTS

| 2,717,138 | 9/1955 | Sheehan | 248/183 |
| 2,882,001 | 4/1959 | Ries et al. | 248/183 |
| 3,123,330 | 3/1964 | Forbes-Robinson | 248/183 |
| 3,353,776 | 11/1967 | Clemens | 248/183 |
| 3,712,571 | 1/1973 | Miller et al. | 248/183 |
| 3,870,265 | 3/1975 | Osborne | 248/183 |

Primary Examiner—Roy D. Frazier
Assistant Examiner—Darrell Marquette
Attorney, Agent, or Firm—Ladas, Parry, Von Gehr, Goldsmith & Deschamps

[57] ABSTRACT

This invention relates to supports for cameras and the like on tripods. Such supports normally provide for tilting and panning of the camera. The invention is concerned with the smooth operation of the support bearings and includes means for maintaining between two relatively rotating surfaces a thin film of a suitable liquid. Further, the support bearings include a hydrostatic control means which allows for adjustment of the bearing friction drag.

13 Claims, 11 Drawing Figures

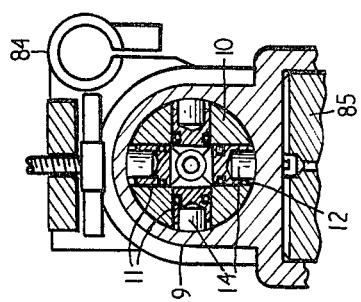
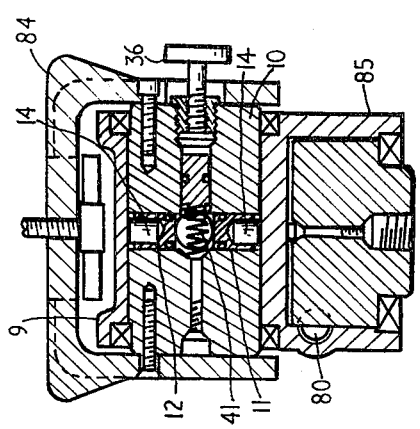
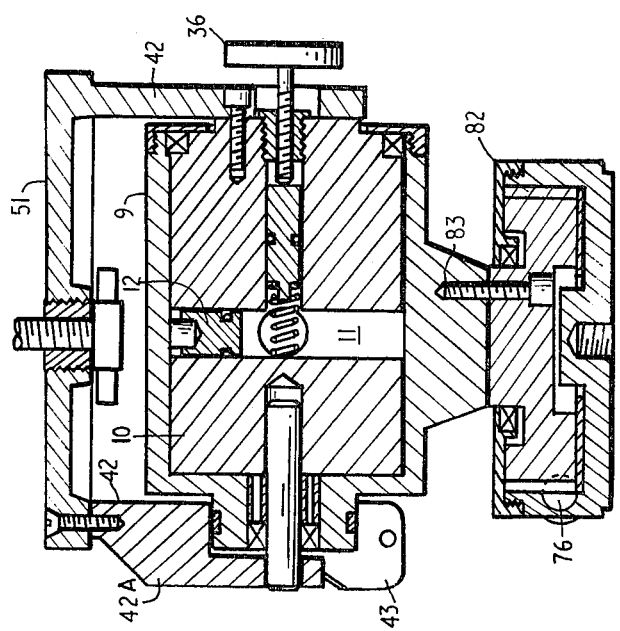

SUPPORTS FOR CAMERAS

This invention relates to supports for cameras and the like on tripods, pedestals and the like. Such supports normally provide for tilting of the camera, that is rotation about an approximately horizontal axis and panning of the camera, that is rotation about an approximately vertical axis. It is important during tilting or panning that the movement of the camera should be fully controlled and smooth in order to ensure, for example, that a moving object which is being photographed should be maintained, when required, as close as possible to the centre of the field of view.

The invention is more particularly concerned with the bearings for tilting and panning movement. It is already known that conventional ball and roller bearings are unsatisfactory and liquid bearings are already in use. These involve maintaining between the two relatively rotating surfaces a thin film of a suitable liquid.

Another object is to provide improved means for controlling the panning or tilting speed for varying conditions, e.g. when following fast or slow movements of the object being photographed or when the object is at varying distances from the camera.

The present invention in one general form is a fluid head suport for rotating an apparatus supported thereon, said support comprising a casing having a substantially cylindrical bore therein, a cylindrical block, which is rotatable within said cylindrical bore, means permitting attachment of said apparatus to said fluid head suport, sealing means to maintain a hydraulic fluid between the cylindrical surfaces of the casing bore and the block, said block provided with a plurality of radical passages, each passage having a brake piston in sliding engagement therein, a control piston-cylinder combination, means permitting fluid communication between the control piston-cylinder combination and the radial passages, means permitting displacement of the control piston and thereby causing radial displacement of the brake pistons relative to the cylindrical surface of the casing bore.

Figure 1A:
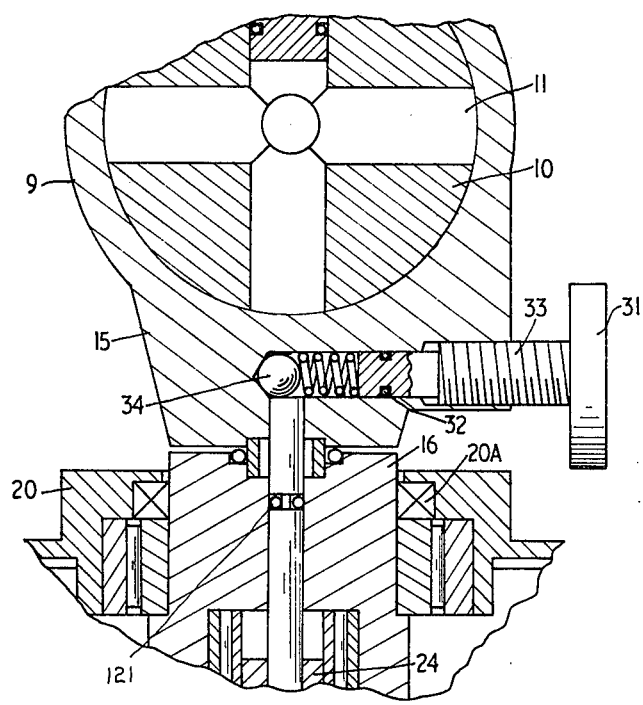
Figure 2:
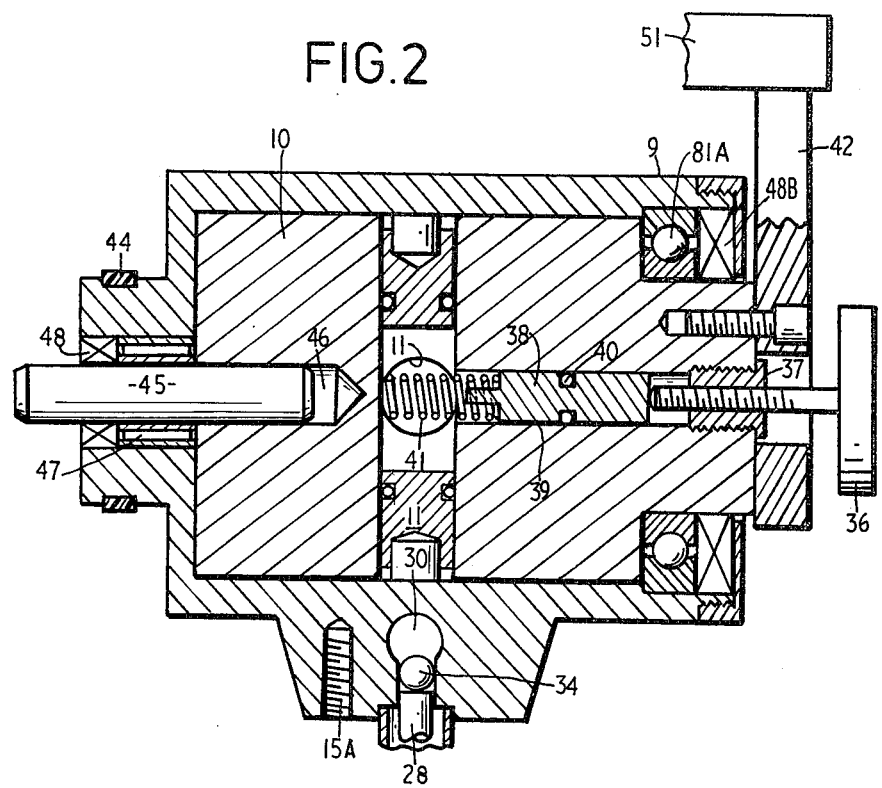
Figure 3:
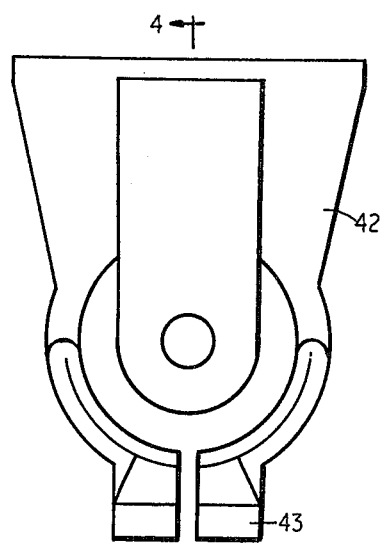
Figure 5:
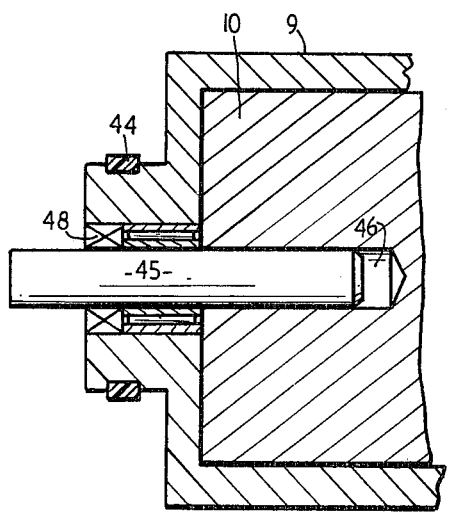
Figure 6:
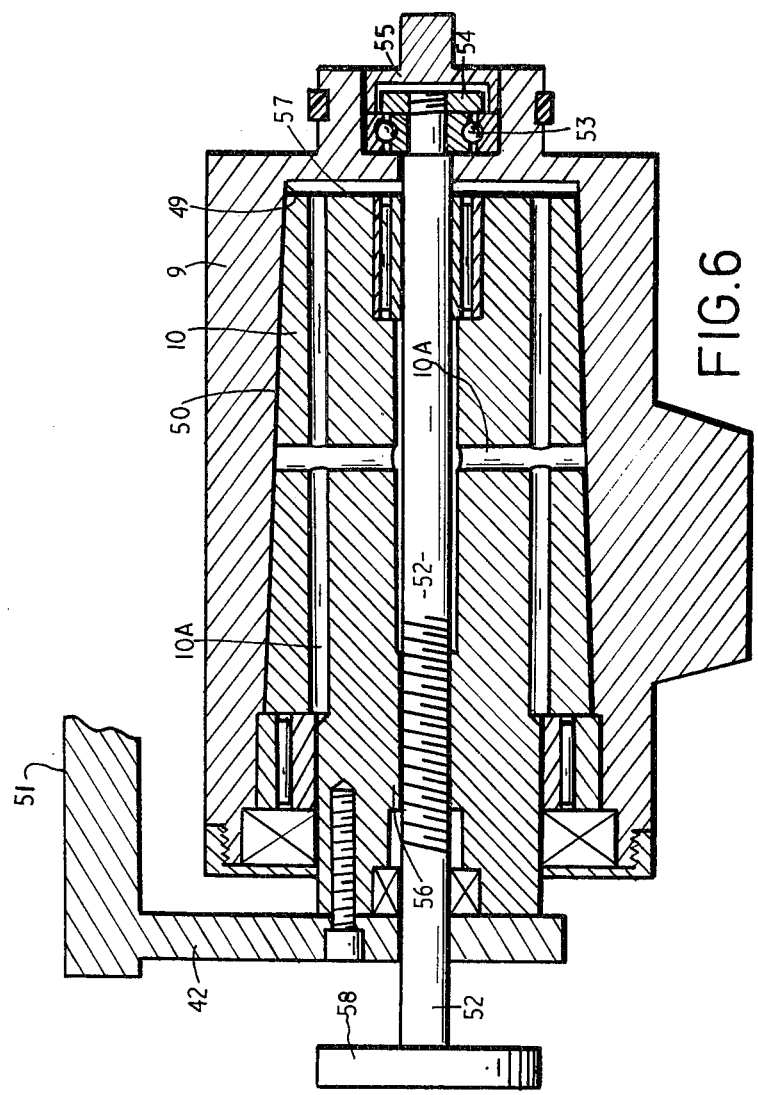
Figure 4:
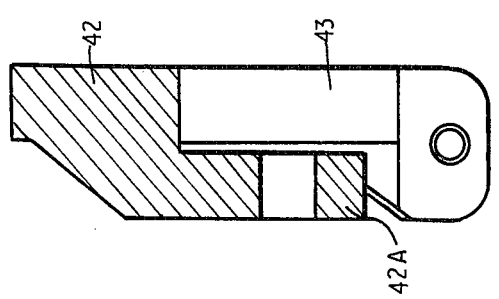
Figure 10:
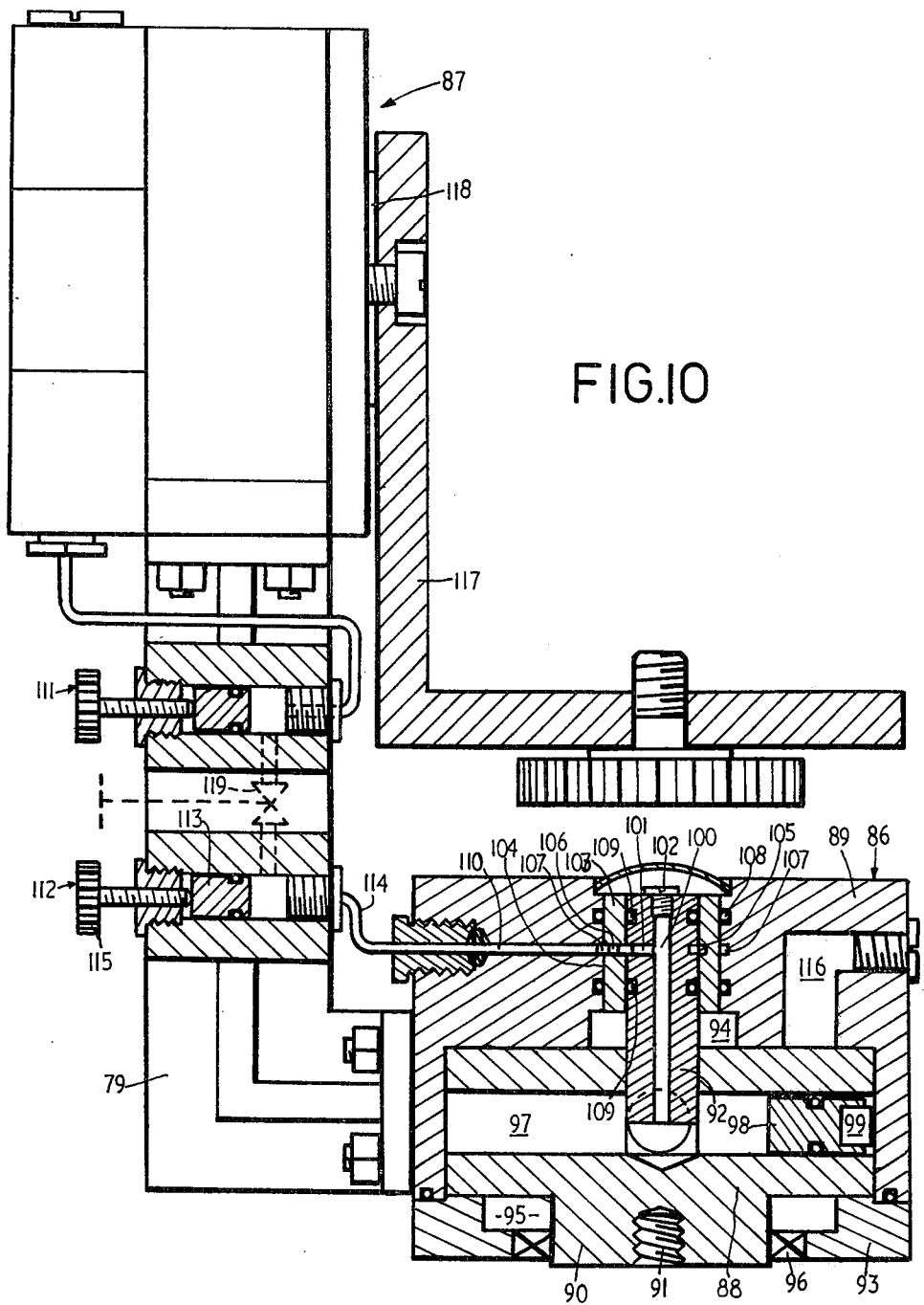

Some preferred forms of the invention will now be described with reference to the accompanying drawings in which:

FIG. 1 is a vertical sectional elevation of a camera mount incorporating the invention, FIG. 1A shos a modification of the camera mounted illustrated in FIG. 1, FIG. 2 is a longitudinal section through a tilt bearing on the upper part of FIG. 1, FIG. 3 is a side elevation of a portion of the upper part of FIG. 1, FIG. 4 is a section on the line 4—4 of FIG. 3, FIG. 5 is a fragmental longitudinal section of a part of the structure of FIG. 2, FIG. 6 shows an alternative form of tilt bearing to that shown in the upper part of FIG. 1, FIG. 7 is a side elevation in section of the tilt unit illustrated in FIGS. 1 and 2 adapted for mounting on a known form of panning unit, FIG. 8 is a side elevation in section of a known form of tripod head adapted to incorporate the tilt control means illustrated in FIGS. 1 and 2, FIG. 9 is an end elevation in section on a medial plane showing principally the tilt mechanism as illustrated in FIG. 8, and FIG. 10 is a side elevation in part section illustrating an offset fluid tripod head incorporating a hydrostatic tilt and panning control means.

In FIG. 1 a camera is mounted on the camera mounting plate 51 which is secured to a tilt block 10 which rotates in a tilt cylinder 9. Passages 11 for pressure liquid are formed through the block 10 and a piston 12 is slidably mounted in each passage 11. Its movement in its passage is made liquid tight by means of O-ring seals 13. A friction pad 14 of nylon or other suitable material is located in a recess in the outer end of each piston 12. The liquid pressure in the passages 11 against the pistons 12 when sufficiently high keeps the pads 14 in braking engagement with the inside of the tilt cylinders 9. Fluid trapped between 9 and 10 provides a braking effect additional to that provided by the pads 14. It should be noted that the position and number of pistons 12 and passages 11 are not restricted to that shown in the drawings (FIGS. 1, 2 and 7 to 10), for instance the tilt block 11 may be adapted to provide a further set of passages 11 in axially spaced relationship to the set of passages illustrated.

The lower end boss 15 integral with the cylinder 9 is secured by bolts at 15A (see FIG. 2) to a central boss 16 on a pan block 17. The block 17 is supported in a pan cylinder 18 having a flange 19. The cylinder 18 is closed at its upper end by a cap 20 screwed onto the flange 19 with an O-ring seal 21 interposed between them. The space in the pan block 17 between the flange 22 and the boss 16 provides a fluid chamber. Fluid can pass from the chamber to the space between parts 17 and 18 through apertures 23. The pan block 17 is rotatable within the cylinder 18 and is separated from a boss 24 on 18 by needle roller bearings 25 of a type which will permit vertical movement of the block within the cylinder whilst maintaining radial alignment. Similar roller bearings are interposed between the upper part of the boss 16 and the cap 20. An oil seal 20A is provided above the upper needle roller bearings. The cylinder 18 is provided with an externally screw threaded stem 26 at its lower end which may be screwed into some fixed support such as a tripod.

An axial passage 27 is formed through the cylinder 18. A rod 28 screw threaded externally engages a corresponding screw thread in a recess at the bottom of the passage 27 so that the relative axial positions of 28 and 18 can be varied. The rod 28 and the cylinder 18 may be secured in any relative position to which they are adjusted by means of a lock nut 29. A seal is provided between the rod 28 and the cylinder 18 by means of an O-ring seal 120.

An inclined passage 30 closed at its inner end is formed through the lower end 15 of the tilt cylinder 9 and is screw threaded at its outer end to receive a pan block lift control screw 31 which is screw threaded to engage the screw thread on passage 30. Movement of 31 in 30 is made liquid proof by means of an O-ring 32. The screw stem 33 is circumferentially grooved at 35 towards its inner end as shown and a thrust ball 34 is located on top of the rod 28 and within the groove 35. Since normally the rod 28 is fixed axially in relation to 18, which in turn is fixed in relation to a abutment such as a tripod, axial movement of 31 will cause upward movement of the pan block 17 inside the cylinder 18. Because of the frusto-conical adjacent surfaces of the flanges 19 and 22 vertical displacement of 17 in relation to 18 will vary the distance between the adjacent surfaces of flanges 19 and 22 and between the underside of 17 and the floor of 18. Usually the spacing of these surfaces determines the degree of control of the panning movement which can be obtained.

An alternative form of pan block lift control, shown in FIG. 1A, may be used by adapting the control screw 31 to permit displacement of a control piston in passage 30, the control piston being in fluid communication with the top of the rod 28. In this alternative form, the passage 30 is formed horizontally through the lower end 15 of the tilt cylinder 9, such that the thrust ball 34 locates against the roof of the passage and thus limiting the rod's movement in one extreme. Further, an O-ring type seal 121 may either be provided between the rod and the lower end 15 of the tilt cylinder or as shown in FIG. 1A, between the rod and the central boss 16 on the pan block 17, to prevent fluid leakage beyond the top of the rod into the pan cylinder 18.

Preferably the apical angle of the frusto-conical surfaces is about 8°.

In FIG. 2 is shown the means by which the liquid pressure in the passages 11 in the tilt block 10 can be maintained. A control means comprises a tilt control screw 36 screwed through a plug 37 which in turn may be screwed either into one end of the tilt block 10, as illustrated (see also FIGS. 7 and 8) or into the camera or mounting plate support arm 42. The inner end of the stem of 36 engages the outer end of a hydraulic piston 38 slidable in axial passage 39 formed in the tilt block 10. The piston 38 is kept liquid tight by seal 40. The inner end of the piston engages one end of a compression spring 41 which ensures the return of the piston 38 when 36 is withdrawn. Axial displacement of the control screw 36 will cause movement of the inner end of 38 and will vary the displacement of hydraulic liquid so as to vary the pressure on the pistons 12 and pads 14.

Those skilled in the art will appreciate that it is possible to adapt the tilt control means to incorporate direct mechanical transmission between control screw 36 and the pistons 12. For example, if the inner end of piston 38 is provided with an integral wedge portion and the inner end of pistons 12 adapted to be in sliding contact with the wedge portion, then axial movement of control piston 38 will cause radial displacement of pistons 12. However, such a system or any equivalent is not satisfactory as any ovality of the titlt cylinder bore will cause uneven braking pressure and even jamming. A hydrostatic transmission will compensate for such defects and further will allow an even progressive adjustment of braking pressure.

FIG. 2 also shows the attachment of spaced arms 42 to the ends of the tilt block 10. For this purpose one arm 42 has spaced ends 43 (see FIG. 3) which can be connected by a bolt and closed onto a nylon locking ring 44 located in a circumferential groove in one end of the tilt cylinder 9. A steel rod 45 is located in a recess 46 in the tilt block 10 with a tight press fit and supports the tilt block. Needle roller bearings 47 maintain radial alignment between 9 and 10 and support components 42, 51 and 42A. Seals 48A and 48B provided at opposite ends of the tilt block 10 to maintain the hydraulic fluid between the cylindrical surfaces of the tilt block 10 and the tilt cylinder 9.

As shown in FIG. 4 a lug 42A is formed integrally with one arm 42 and is apertured to receive the outer end of 45. The other arm 42 is secured to the tilt block 10 by a set screw.

In FIG. 6 the tilt cylinder 9 is formed with a frusto-conical inner chamber 49. The tilt block 10 is provided with a corresponding frusto-conical outer surface 50 having the same apical angle as the chamber 49. Preferably this is about 2° to 4°. As before the camera support plate 51 is provided with depending arms 42 one of which is clamped to one end extension of the tilt cylinder 9. That end extension is recessed to receive the inner end of an adjusting rod 52 which is held against axial displacement by ball bearings 53, a lock nut 54 and an end cap 55. The rod 52 is in screw threaded engagement with portion of a passage 56 in the block 10 through which the rod 52 passes. Needle roller bearings 57 are provided between the block 10 and the rod 52. Rotation of the rod by its screw head 58 will displace the block 10 in relation to the cylinder 9 and will thus vary the side space and the end space between the cylinder 9 and the block 10.

A reservoir of fluid is provided in the space between components 9 and 10. Passages 10A for fluid are provided in 10 to facilitate flow of fluid as tilt bolt 10 moves axially in and out of cylinder 9 and to ensure an adequate flow of fluid to the space between 9 and 10. As in the arrangement of components 17 and 18 in FIG. 1, relative axial displacement of 9 and 10 varies the thickness of the film of liquid between them and therefore the viscous drag.

Usually one fluid will be used in the forms of the invention shown in FIGS. 1 to 6 and 10. Preferably this is a commercially available silicone fluid such as that marketed as Dow Corning 200 fluid or one having similar characteristics to those of Dow Corning 200. In some circumstances, for example in the device of FIG. 7, a lubricating additive may have to be added to prevent component galling. It will be seen that a bearing corresponding to that shown at 81A in FIG. 2 has been omitted in this form of tilt head. FIG. 7 also shows the tilt unit mounted upon a known form of panning unit 82 and secured thereto by set screws 83.

FIG. 7 illustrates the tilt unit of FIGS. 1 and 2 adapted for mounting on a known form of panning unit, and numerals 42, 42A, 43 and 45 refer to like components in FIGS. 3, 4 and 5, being a camera support plate secured to the tilt head.

FIG. 8 illustrates a known tripod head adapted to incorporate the tilt control means illustrated in FIGS. 1 and 2, of which numerals 9, 10, 11, 12 and 14 refer to corresponding components. Further, in FIGS. 8 and 9, another known form of camera support plate 84 is shown secured to the tilt block 10. The assembly is rotatably mounted on a second known form of panning unit 85.

Both abovementioned known panning units, as illustrated in FIGS. 7 and 8, are provided with known friction brakes 76 and 80 respectively.

In FIG. 10 an offset fluid tripod head is shown incorporating a hydrostatic tilt and panning control system to illustrate that both tilt and panning units may be adapted to include hydrostatic braking. Further, FIG. 10 illustrates the ease with which a hydrostatic system may be adapted to incorporate remote and parallel control.

The offset fluid head consists of basically two similar fluid support units the casings of which are secured to each other by means of an offset angle bracket 79, one of the units 87, namely the panning unit, is mounted for use with its rotational axis in a vertical plane, and the other unit 88, namely the tilt unit, is mounted for use with its rotational axis in a horizontal plane.

As both units 86 and 87 are similar only one unit 86 will be described in detail. The panning unit 86 comprises of a pan block 88 rotatably mounted with a casing or cylinder 89, the pan block having a boss 90 which may be attached to a tripod by means of a securing screw located in threaded mounted hole 91. A support pin 92 is fitted into a coaxial hole in the pan block with a tight press fit. The casing 89 is provided with a cover 93, sealingly secured to the casing by means of cap screws or the like, and the pan block 88 is supported by an inner support bearing 94, which is located in the casing and mounted on pin 92, and an outer support bearing 95, which is located in the cover. The cover 93 also includes a seal 96 between it and boss 90. The pan block is formed with a plurality of radial passages 97 in which secondary pistons 98 may slide and each piston having pads 99, similar to those illustrated in FIGS. 1 and 2. The support pin 92 is formed with a passage 100 along its axis which communicates with the passages 97 and is ported at 101. A hydrostatic bleed screw 102 is provided to seal one end of passage 100 at the outer end of support pin 92 which is located in a sleeve 103 mounted with a tight fit within a bore 104 in the casing. An annular groove 105 is formed in the bore of sleeve 103 and is open to and communicates through a hole or holes 106 and an annular groove 107 in the casing bore with a passage 110. A pair of static O-ring seals 108 are provided between sleeve and casing and are located on either side of groove 107. A pair of dynamic seals 109 are similarly located between support pin and sleeve. Sleeve 103 is not essential to the unit but preferable, particularly if the casing is fabricated from a cast material which may have blow holes and other imperfections. Use of the sleeve ensures a good oil tight seal between the rotatable pin and casing.

Primary hydrostatic cylinders 111 and 112 for both tilt and pan units respectively, are illustrated in FIG. 10 as being mounted on the angle bracket 79, however, the cylinders may be mounted in any convenient position. The pan control primary cylinder 112 is connected by means of a pressure line 114 to passage 110 in the pan unit casing 89 and is provided with a control piston 113 and screw 115, by which the pressure exerted on the inside of the pan cylinder 89 by secondary pistons 98 may be adjusted. To give a smooth and damped rotational action, the space between pan block and cylinder is filled with a suitable hydraulic fluid, a reservoir 116 for which is provided in the casing to maintain the space in a flooded condition.

As indicated above the tilt unit is similar to the pan unit excepting that a camera support bracket 117 is secured to the boss 118 of the rotatable block, the bracket being mountable to the boss at various positions relative to the axis of the tilt unit to suit a variety of cameras To allow for parallel operation of the hydrostatic control system a valve 119, illustrated in broken lines, may be inserted between the primary cylinders. On opening the valve adjustment may be achieved by use of one or the other of control screws.

What we claim is:

1. A fluid head support for rotating an apparatus supported thereon, said support comprising a casing having a substantially cylindrical bore therein, a cylindrical block, which is rotatable within said cylindrical bore, means permitting attachment of said apparatus to said fluid head support, sealing means to maintain a hydraulic fluid between the cylindrical surfaces of the casing bore and the block, said block being provided with a plurality of radial passages, an open end of each of said passages being located adjacent the cylindrical surface of the casing bore, each passage having a brake piston in sliding engagement therein, each said piston being located adjacent said open end of its respective passage, a control piston cylinder combination, means permitting fluid communication between the control piston-cylinder combination and the radial passages, means permitting displacemebt of the control piston and thereby causing radial displacement of the brake pistons relative to the cylindrical surface of the casing bore.

2. A fluid head support as claimed in claim 1 wherein the means permitting axial displacement of the control piston is a manual control screw.

3. A fluid head support as claimed in claim 2 wherein the control piston is located in an axial passage in the block, the axial passage intersecting with said radial passages.

4. A fluid head support as claimed in claim 1 wherein the control piston-cylinder combination is remotely located from the casing and said means permitting fluid communication therebetween comprise an axial passage in the block intersecting with the radial passages, a casing fluid passage means permitting fluid flow between the axial and casing passages during rotational movement of the block with respect to the casing, and a conduit adapted to provide fluid communication between control cylinder and the casing passage.

5. In combination a first and second fluid head support as claimed in claim 4, said fluid heads being adapted for mounting to each other with their axes of rotation being aligned perpendicular to each other.

6. The combination as claimed in claim 5 including a valve adapted to permit fluid communication between the respective control cylinders of the first and second fluid heads.

7. A fluid head support as claimed in claim 1 wherein said means permitting attachment of said apparatus to said fluid head comprises an apparatus mounting plate, two mounting plate support arms spaced apart and parallel to each other and each perpendicularly secured at one end thereof to the mounting plate, one arm being secured to one end of the block and the other arm being located on a first spigot which is coaxially aligned with the axis of rotation of the block and is either secured to the other end of the block or to the casing adjacent said other end of the block, said other arm having a clamp member secured thereto and sized and shaped to permit clamping engagement with a second spigot mounted on the casing and coaxially aligned with said first spigot.

8. In combination a first fluid head support as claimed in claim 1 and a second fluid head, said fluid heads being mounted to each other with their axes of rotation aligned perpendicular to each other, said second fluid head comprising a second casing having a tapered bore therein, a correspondingly tapered second block, which is rotatable within said tapered bore, sealing means to maintain a hydraulic fluid between the corresponding tapered surfaces of the second block and casing, means permitting axial movement of the second block with respect to the second casing, thereby allowing the distance between the corresponding tapered surfaces to be varied.

9. The combination as claimed in claim 8 wherein said means permitting axial movement of the second block with respect to the second casing comprises a rotatable adjusting rod having a threaded portion between its ends and an axial passage through the second block having a corresponding threaded portion, means permitting the rod to be held against axial displacement with respect to the second casing.

10. The combination as claimed in claim 8 wherein said means permitting axial movement of the second block with respect to the second casing comprises a rod, which protrudes from the second casing and extends into a coaxial passage within the second block, means permitting axial movement of the rod relative to the second block and thereby causing axial displacement of the second block with respect to the second casing.

11. The combination as claimed in claim 8 wherein said means permitting axial movement of the second block with respect to the second casing comprises a rod, which protrudes from the second casing and extends into a coaxial passage within the second block, sealing means between the rod and second block, means permitting fluid communication between a control piston-cylinder combination and an ebd of the rod which end extends into the coaxial passage, thereby, on displacement of the control piston, causing axial displacemnt of the second block with respect to the second casing.

12. The combination as claimed in claim 10 including means for adjusting the axial position of the rod with respect to the second casing, thereby permitting adjustment of a minimum clearance between block and casing surfaces.

13. A fluid head support as claimed in claim 1, wherein said block is a tilt block and said casing is a tilt casing, and said means permitting attachment of said apparatus to said fluid head comprises an apparatus mounting plate, two mounting plate support arms spaced apart and parallel to each other and perpendicularly secured at one end thereof to the mounting plate, one arm being secured to one end of the tilt block and the other arm being located on a spigot, which is coaxially aligned with the axis of rotation of the block and is secured to the casing adjacent the other end of the block, said other arm having a clamp member secured thereto and sized and shaped to permit clamping engagement with said spigot.

* * * * *